Oct. 4, 1966 W. C. BURNS 3,276,941
METHOD FOR BUTT-WELDING THERMOPLASTIC MEMBERS AND PRODUCT
Filed Oct. 23, 1963

INVENTOR:
WILLIAM C. BURNS
BY: *Martin S. Baer*
HIS ATTORNEY

United States Patent Office 3,276,941
Patented Oct. 4, 1966

3,276,941
METHOD FOR BUTT-WELDING THERMOPLASTIC MEMBERS AND PRODUCT
William C. Burns, Woodbury Heights, N.J., assignor to Shell Oil Company, New York, N.Y., a corporation of Delaware
Filed Oct. 23, 1963, Ser. No. 318,298
8 Claims. (Cl. 161—36)

This invention relates to butt-welding of thermoplastic articles. More particularly it relates to an improved method for preparing beadless butt-welded joints by the heated-tool method of welding and to an improved design of the sections of the joints to be welded together.

Thermoplastic polymers are widely used in the production of consumer goods. In many such uses the aesthetic appearance of welded joints is of primary importance. The bead which forms at the joint during most welding processes is often objectionable. This is particularly true in the case where two sections of different color are to be joined together.

This invention provides a simple metrod for preventing the formation of any bead whatever in the butt-welding of thermoplastic articles. Joints produced according to this invention from members of different colors are characterized by clean separation of the colors.

One embodiment of this invention comprises specially designed sections of joints, suitable for butt-welding by the heated-tool method and adapted to produce beadless joints either on one or on both sides of the weld.

Another embodiment of this invention comprises methods for butt-welding thermoplastic members, resulting in the formation of strong, neat, beadless joints.

This invention is illustrated by the drawing wherein.

Figure 8:
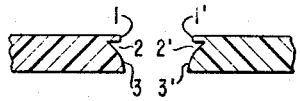
Figure 9:
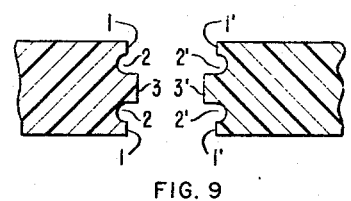
Figure 10:
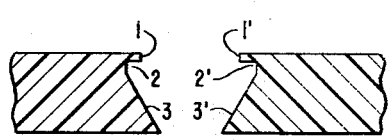

FIGS. 8, 9, and 10 show in cross section two adjacent ends of varying designs, of two members to be welded.

Heated-tool welding of thermoplastic materials is a well-known technique and need not be further described herein. It is described, for example, in Chapter 5 of "Welding of Plastics," by J. A. Neumann et al., Reinhold Publishing Corp., New York, 1959, and in manufacturers' pamphlets such as "Making Better Plastic Welds," by D. W. Thomas, Laramy Products Company, Inc., Cohasset, Mass., 1962.

Heated-tool welding can be used to weld tubes, pipes and other circular or irregular cylindrical shapes, and sheets or other non-cylindrical shapes. Heretofore the edges of articles to be welded by this method generally have been straight or simply beveled and the welds characterized by at least some flashing or beading over the weld. Such flashing is generally not aesthetic.

Normally the bead is composed of two separate molten rings of material. Such a bead interferes with flow of contained liquids or solids, is unsightly, and for these and other reasons is detrimental to attractive and useful product designs. A separate finishing operation that mechanically or thermally shaves the bead off must be used to "dress up" or finish the surface of the part. In the case where parts of different color or external appearance are joined even such dessing up does not produce a clean line between the parts.

The jont design and method of welding of this invention provide a simple and clean method of joining plastic parts by heated-tool welding, resulting in neat, beadless joints.

Referring to the drawing, each of FIGS. 1, 3, 5 and 7 through 10 illustrates two thermoplastic members to be welded together. As shown in section, each of the members is grooved to provide a cross section in which at the beadless side of the joint there is a narrow "cold shoulder" 1 or 1', a recess or groove 2 or 2', and a protrusion 3 or 3' which extends beyond the plane of shoulder 1.

In designing the shape of the section for each member, the shoulders 1 and 1' of two opposite members are designed to be in precise alignment with each other when the weld is completed; they are ordinarily at right angles to the flat side 4 of the member.

Figure 1:
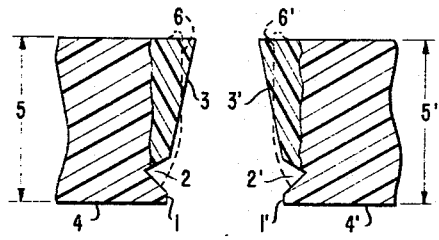
FIG. 1 shows in cross section two adjacent members to be welded.
Figure 3:
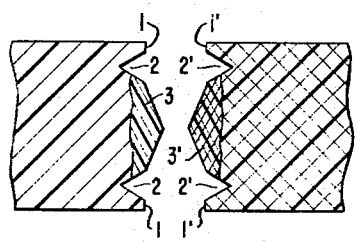
FIG. 3 shows in cross section a different design of two adjacent members to be welded.
Figure 5:
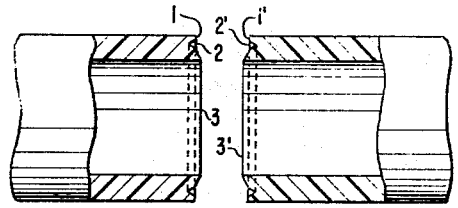
FIG. 5 shows in partial cross section two pipe sections to be welded.

Recess 2 or 2' is a groove of any desired cross-sectional shape, such as a triangle, semi-circle, rectangle or the like. Equilateral triangle shapes are illustrated in FIGS. 1, 3 and 5; irregular triangle in FIG. 7; semi-circles in FIG. 9; and irregular shapes in FIGS. 8 and 10.

Recess 2 or 2' is designed to have sufficient volume to retain excess molten plastic and preferably to be not quite filled with the excess molten plastic produced during the welding step.

Figure 7:
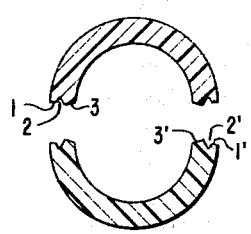
FIG. 7 shows in cross section two half cylinders to be welded.

Protrusion 3 or 3' may be of any desirable shape. It is designed to jut out sufficiently beyond shoulder 1 or 1' so that it is melted when in contact with the heating element, providing the amount of liquid plastic material required to produce a weld while shoulder 1 or 1' remains sufficiently far from the heated surface to remain unheated. A triangular shape of protrusions 3 or 3' is illustrated in FIGS. 1, 3, 5, 7 and 10 and other geometric shapes in FIGS. 8 and 9. The part of protrusion 3 or 3' which extends the greatest distance beyond shoulder 1 or 1' may be near the recess, as illustrated in FIG. 7; or at the edge opposite the cold shoulder as illustrated in FIGS. 1, 5, 8 and 10. Where the joint is designed to be beadless at both edges, the greatest extension of protrusion 3 or 3' is ordinarily in the center, as illustrated in FIGS. 3 and 9.

In producing a weld according to this invention, two members having identically designed joints of the types illustrated in the drawing are placed in alignment with corresponding parts of the joints exactly opposite each other and separated by a sufficient distance to admit a heating element which has substantially flat faces adapted to contact protrusions 3 and 3'. With the heated heating element inserted between the joints, the pieces are brought in contact with the heating element by being moved toward said element only to the extent that said protrusions 3 and 3' contact said heating element and are melted and deformed while said shoulders 1 and 1' do not contact it and remain below their melt temperature. After the protrusions are sufficiently softened the members may be moved apart slightly; the heating element is then removed and the members, still aligned as stated above, brought together with a yielding pressure, just sufficient to permit cold shoulders 1 and 1' to touch, face to face. The melted displaced portion of protrusion 3 is thus forced into recess 2. The weld hardens quickly and the welded piece can then be removed and handled. Suitable apparatus for carrying out such a welding method is described in detail, for example, in U.S. Patent 2,384,014 to Cutter.

In FIGS. 1 and 3 the different cross hatching of protrusions 3 and 3' is intended to illustrate the extent to which the plastic material is melted or softened while in contact with the heating element during the welding step.

Once the member is in contact with the heating element, the configuration of protrusions 3 and 3' changes due to the heated plastic being displaced, approximately as illustrated by dotted line 6 of FIG. 1. The degree of softening within the part varies, of course, with distance from the heat source.

Figure 2:
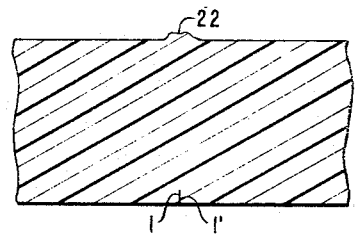
FIG. 2 shows in cross section the resulting weld.

After protrusion 3 of each member of the weld has been softened by contact with a heating element, the latter (not shown in the drawings) is immediately withdrawn and the two members are carefully brought into contact in the desired alignment. FIG. 2 illustrates the appearance, in section, of the weld of members shaped as in FIG. 1. Since shoulders 1 were not heated they remain discrete. Depending on the care with which the joint was made, the shoulders will show as an almost invisible hairline or as a somewhat more noticeable, clean line around the joint. At the opposite side of the weld is bead 22, which is typical of beads formed during conventional heated tool welding.

Figure 4:
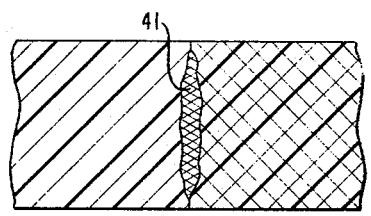
FIG. 4 shows in cross section the resulting weld.

FIGS. 3 and 4 illustrate welding of a joint in which both sides of both members are designed to result in a beadless joint. For the sake of illustration the two members are cross hatched to indicate different colors of plastic. Section 4 shows the beadless joint and shows a zone 41 in which the two colors are fused in the weld and gradually change from one to the other.

Figure 6:
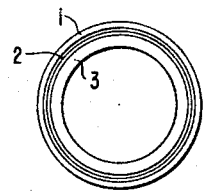
FIG. 6 shows in elevation the end view of one of said pipe sections.

FIG. 5 illustrates how two tubular members appear prior to joining according to this invention, with a beadless joint at the outside of the tube only. FIG. 6 shows the end view of one of the two members.

FIG. 7 illustrates two half cylinders in section, designed for producing a beadless joint at the outside of the cylinder resulting from their welding.

FIGS. 8, 9 and 10 illustrate some of the variations possible in the appearance of the groove and protrusion portions of members designed to produce beadless joints according to this invention.

The method of this invention is particularly suitable for welding parts of at least about 1/16" thickness, and generally of 1/16" to 1/2" in thickness. For convenience, width of the section to be welded will be referred to as wall thickness.

The joint sections in the drawing are not drawn to scale. In suitable designs of such joints according to this invention, the width of the cold shoulder may be from about 5 to 30% of the wall thickness, and is preferably from about 10 to 20% thereof. In the preferred designs the width of the cold shoulder is in the range from 0.01 to 0.03 inch, most suitably about 0.02 inch. This width must be sufficient to prevent deformation of the shoulder during the welding step. While greater width can be used, this detracts from the strength of the joint without, in general, a compensating advantage.

The dimensions of the recess are such that its volume is somewhat greater than the volume of molten plastic expected from melting of the protrusion. A volume excess of 20 to 30 percent is preferred. The width of the recess, in designs such as illustrated in FIGS. 1, 3, 6, 7 and 9, is suitably in the range from 0.02 to 0.05 inch and preferably about 0.02 to 0.03 inch. The depth of the recess, measured from the plane of the cold shoulder, is suitably from 0.02 to 0.05 inch.

The distance by which the protrusion extends beyond the cold shoulder is at least about 0.01 inch and may be as much as 0.04 inch. About 0.02 inch is generally suitable.

The volume of the recess and the displaced melted volume of the protrusions are both measured from the projected plane of the face of the cold shoulder.

Members having joint configurations required in this invention are most suitably produced by molding the whole member in a mold having the desired shape, utilizing conventional molding methods. However, suitable joints can also be produced by machining the ends of the members to be joined, or by pressing the member against a die at conditions at which the end is softened and suitably reshaped.

The basic difference between the beadless joint design of this invention and those of the prior art lies in the cold shoulder or stop which serves three major functions during the joining process. The functions are: (1) to provide a guaranteed cold side for the recess so that it will not deform during exposure to heat; (2) to provide a positive dam to external flow of that portion of the melt which does not directly enter the recess; and (3) to provide a positive mechanical stop to limit the amount of molten material that may be pushed out of the joint. These functions will be discussed separately and in order.

The recess alone is inadequate to prevent bead formation in hot plate welding where pieces to be joined receive necessary heat from an outside source and require more total heat to melt a greater volume of material than in spin or friction welding. If a joint were designed merely with a recess but with no protrusion of one portion of the joint beyond the cold shoulder, the total recess would become part of the melt and a flashing or bead would result. In the joint design of this invention, one side of the recess is part of the cold shoulder and is able to keep its shape and retain the melt.

A dam or barrier to molten material trying to flow to the beadless side of the joint is an absolute requirement in hot plate welding if the formation of a bead is to be prevented. The recess is designed to contain the flow moving to the outside; however the melted plastic material is extremely viscous during contacting of the parts and the direction of flow may be straight to the outside surface instead of into the provided recess. The cold shoulder barrier stops the material moving out and forces it to enter and fill the recess.

The provision for a mechanical stop to limit total axial movement of the two mated pieces of the joint is required to prevent removal of the major portion or all of the molten polymer from the joint area. Joint strength is achieved only through efficient welding of molten material from the two mating pieces. If this molten material were shoved out because of excess end force, cold solid state polymer would meet, resulting in very low if any joint strength. The cold shoulder prevents this undesired result by presenting a built-in stop against further movement after sufficient force has been applied to bring the members into contact.

This invention has been found particularly advantageous in the welding of substantially crystalline linear polypropylene such as is now commercially available. It is also applicable to the welding of other thermoplastic materials such as rigid linear polymers and copolymers of ethylene, other alpha-monoolefins, vinylidene chloride, methylmethacrylate polymer, polystyrene, and the like.

Reasonable variations and modifications are possible within the scope of this invention without departing from the spirit and scope of the invention.

I claim as my invention:

1. A thermoplastic member having an edge of hereinafter defined shape and of sufficient thickness to be butt-welded to another thermoplastic member having an edge of corresponding shape to form a joint which shows no bead on at least one side, the edges of said members which are adapted to be thus welded having,
    (1) at each side which no bead is to formed, a narrow shoulder,
    (2) a recess, immediately adjacent said shoulder, said recess being adapted to receiver molten plastic during the welding operation, and
    (3) immediately adjacent said recess and within the space defined by projecting said edge, a protrusion extending in said space beyond said shoulder, said protrusion being adapted to be melted and completely displaced into said recess or recesses during said welding operation.

2. The article according to claim 1 wherein said thermoplastic is polypropylene.

3. A thermoplastic member having an edge of hereinafter defined shape and of sufficient thickness to be butt-welded to another thermoplastic member having an edge of corresponding shape to form a joint which shows no bead on either side, the edges of said members having
   (1) at each side a narrow shoulder,
   (2) two recesses, each immediately adjacent one of said shoulders, said recesses being adapted to receive molten plastic during the welding operation, and
   (3) between said two recesses a protrusion extending beyond said shoulders and being adapted to be melted and completely displaced into said recesses during said welding operation.

4. The article according to claim 3 wherein said thermoplastic is polypropylene.

5. A method for butt-welding thermoplastic members to form a joint which shows no bead on at least one side, comprising
   (a) shaping the opposing edges of the parts to be joined to produce thereon
       (1) at each side at which no bead is to be formed, a narrow shoulder,
       (2) a recess, immediately adjacent said shoulder, adapted to receive molten plastic during the welding operation,
       (3) an immediately adjacent said recess a protrusion adapted to be melted and displaced during said welding operation,
   (b) positioning said members with said shoulders, recesses and protrusions in opposed relationship,
   (c) heating only said protrusions to their melting temperature, and
   (d) yielding forcing said members into intimate contact, whereby a weld is formed and the displaced portion of said molten protrusions is forced into said recesses.

6. The method according to claim 2 wherein said thermoplastic is polypropylene.

7. The method according to claim 5 for butt-welding thermoplastic members to form a butt-welded joint which shows no bead on either side, wherein each of said edges is defined by surfaces which are substantially parallel adjacent to said edge and by a surface transverse to said parallel surfaces; and wherein each of said edges is shaped to have a narrow shoulder at each side, a recess immediately adjacent to each of said shoulders, and a protrusion located between said recesses.

8. The method according to claim 7 wherein said thermoplastic is polypropylene.

References Cited by the Examiner

UNITED STATES PATENTS

| 2,397,743 | 4/1946 | Kaphan | 264—248 |
| 3,100,172 | 8/1963 | Nier | 264—248 |

FOREIGN PATENTS 139,118  10/1934  Austria.

EARL M. BERGERT, *Primary Examiner.*

DOUGLAS J. DRUMMOND, *Examiner.*